(12) United States Patent
Leslie et al.

(10) Patent No.: US 10,932,452 B2
(45) Date of Patent: Mar. 2, 2021

(54) AQUACULTURE ASSEMBLY AND METHOD

(76) Inventors: Steven J. Leslie, Tasmania (AU);
Yvonne E. Young, Tasmania (AU)

( * ) Notice: Subject to any disclaimer, the term of this patent is extended or adjusted under 35 U.S.C. 154(b) by 0 days.

(21) Appl. No.: 13/639,885

(22) PCT Filed: Apr. 7, 2011

(86) PCT No.: PCT/AU2011/000402
§ 371 (c)(1),
(2), (4) Date: Nov. 8, 2012

(87) PCT Pub. No.: WO2011/123895
PCT Pub. Date: Oct. 13, 2011

(65) Prior Publication Data
US 2013/0186345 A1    Jul. 25, 2013

(30) Foreign Application Priority Data
Apr. 7, 2010   (AU) ................................ 2010901459

(51) Int. Cl.
*A01K 61/60* (2017.01)
*A01K 61/54* (2017.01)

(52) U.S. Cl.
CPC .............. *A01K 61/60* (2017.01); *A01K 61/54* (2017.01); *Y02A 40/81* (2018.01)

(58) Field of Classification Search
CPC ..... A01K 61/00; A01K 61/002; A01K 61/006
USPC ............................ 119/223, 239, 240; 405/26
See application file for complete search history.

(56) References Cited

U.S. PATENT DOCUMENTS

| | | | | |
|---|---|---|---|---|
| 310,551 | A | * | 1/1885 | Averell ........................... 405/26 |
| 2,283,472 | A | * | 5/1942 | Tuxhorn ....................... 119/223 |
| 2,989,945 | A | * | 6/1961 | Ford ............................. 119/240 |
| 4,264,233 | A | * | 4/1981 | McCambridge ............... 405/26 |
| 4,395,970 | A | | 8/1983 | Kunkle et al. |
| 5,251,571 | A | | 10/1993 | Willinsky et al. |
| 5,412,903 | A | * | 5/1995 | Zemach et al. ................. 43/102 |
| 6,481,378 | B1 | * | 11/2002 | Zemach ........................ 119/223 |

(Continued)

FOREIGN PATENT DOCUMENTS

| | | |
|---|---|---|
| CN | 1484948 | 3/2004 |
| GB | 2 170 083 | 7/1986 |
| JP | 2004-113003 | 4/2004 |

OTHER PUBLICATIONS

PCT/AU2011/000402 International Preliminary Report on Patentability dated Apr. 12, 2012 (4 pages).
New Zealand Patent Application No. 305246 filed Mar. 22, 1996.

*Primary Examiner* — Ebony E Evans (57) ABSTRACT

The present invention provides aquaculture assemblies for culturing oysters in deep waters and includes at least one structure adapted for culturing an aquacultural species; at least one floatation means; and at least one anchoring means connecting said floatation means to the sea bed; wherein said structure is connected to or comprises said floatation means or said floatation means comprises said structure; and wherein said assembly is adapted for supporting said at least one structure either: a) substantially above the water surface at low-tide, and at least substantially below the water surface at high-tide, or b) substantially just below the water surface at low-tide, and fully below the water surface at high-tide. Methods for culturing aquacultural species using assemblies according to the invention are also provided.

19 Claims, 10 Drawing Sheets

(56) References Cited

U.S. PATENT DOCUMENTS

| | | |
|---|---|---|
| 7,650,856 B2 | 1/2010 | Quinta Cortiñas et al. |
| 2003/0094141 A1* | 5/2003 | Davis .......................... 119/234 |
| 2009/0288612 A1* | 11/2009 | Himmelstrup ................ 119/223 |

* cited by examiner

AQUACULTURE ASSEMBLY AND METHOD

FIELD OF THE INVENTION

The present invention relates to assemblies and methods for culturing aquatic species especially for human consumption. The present invention finds particular application in the culture of inter-tidal shellfish species such as oysters and clams. It also has application in the culture of sub-tidal shellfish species, including sub-tidal oysters such as *Ostrea angasi* (Australian native flat oyster) and *Ostrea edulis* (European flat oyster).

BACKGROUND OF THE INVENTION

Many oyster species are cultivated for high value aquaculture products. Each species of oyster has unique requirements; those requiring inter-tidal conditions, such as Pacific oysters and Sydney rock oysters, need to spend time out of water at low-tide, which assists in hardening their cupped-shape shells and strengthening their abductor muscle. These features improve the quality of the product and extend shelf-life at market; which increases their value. Certain sub-tidal species, such as *Ostrea angasi* and the closely related *Ostrea edulis* can also benefit from being cultivated just below the water surface (and therefore under sub-tidal conditions), which assist in shell-hardening, hygiene and cleaning.

Inter-tidal species grown sub-surface in deep-water sites have been used predominantly to produce oyster meats for the processing industry. Alternatively, when these deep-water sites are used to grow inter-tidal oyster species for the high-value end of the oyster market, i.e. oysters presented in their shell, these oysters require regular rumbling and grading to create the desired cupped shape and have often required translocation to shoreline inter-tidal waters to prepare them for market.

Currently available inter-tidal shellfish growing systems are limited to shallow water (up to 2.5 meter depth at high-tide), where long-lines or racks/trestles, with trays, baskets or cages/containers, are supported by framework structures embedded in the sea bed. These systems are worked in conjunction with the tides. At low-tide these framework structures are exposed above the water surface, allowing the aquaculturalists wearing waders to wade along the lines, loading the baskets/cages/trays/containers onto their work vessels for harvest/grading or to undertake regular maintenance work. Current oyster-rearing systems and methods are labour-intensive, and labour costs are typically the major expense in oyster cultivation.

Available suitable inter-tidal shellfish growing zones are limited. Also, tides dictate when aquaculturalists may access the oysters and associated structures for harvesting or maintenance work.

There is a need for aquaculture systems which will allow aquaculturalists to employ a wider range of environments, while still producing oysters of premium quality as those grown in inter-tidal zones.

There is also a need for aquaculture systems which will simplify harvesting of oysters and maintenance work on the associated holding structures, and allow this at times independent of tides.

SUMMARY OF THE INVENTION

According to a first embodiment, the present invention provides an aquaculture assembly comprising:

at least one structure adapted for culturing an aquacultural species;
at least one floatation means; and
at least one anchoring means connecting said floatation means and said at least one structure to, and at a set distance from to the sea bed;

wherein said structure is connected to or comprises said floatation means or said floatation means comprises said structure; and wherein said floatation means is adapted to supporting said at least one structure substantially above the water surface at low-tide, and at least substantially below the water surface at high-tide, thereby maintaining said aquacultural species under artificial inter-tidal conditions, due to tides; and wherein said at least one anchoring means is adjustable such that the distance between said at least one structure and the sea bed is adjustable such that said floatation means may selectively support said at least one structure substantially just below the water surface at low-tide, and fully below the water surface at high-tide, thereby maintaining said aquacultural species under artificial sub-tidal conditions, due to tides.

According to another embodiment of the invention, there is provided a method for culturing an aquacultural species comprising cultivating said aquacultural species using an assembly according to the invention as described herein.

According to an embodiment, the assemblies or methods of the invention may be used to culture aquacultural species such as oysters. In one embodiment, said aquaculture species is selected from inter-tidal species such as Pacific oyster (*Crassostrea gigas*) and Sydney rock oyster (*Saccostrea glomerata*) and sub-tidal species such as Australian native flat oyster (*Ostrea angasi*) and European flat oyster (*Ostrea edulis*).

DEFINITIONS

As used herein, the term "comprising" means "including, but not to the exception of other physical, procedural or methodological components". Variations of the word "comprising", such as "comprise" and "comprises", have correspondingly similar meanings.

As used herein, the term "oyster" includes all members of the Ostreidae family, and especially those members commonly cultivated for human consumption, including especially oysters with an inter-tidal habitat such as members of the genera *Crassostrea* and *Saccostrea* such as the Pacific oyster (*Crassostrea gigas*), the Sydney rock oyster (*Saccostrea glomerata*, also classified as *Saccostrea comercialis*), Portuguese oyster (*Crassostrea angulata*), and American cupped, or Eastern oyster (*Crassostrea virginica*), as well as some sub-tidal species such as *Ostrea angasi*, (Australian flat oyster; Southern mud oyster; Australian native flat oyster) and *Ostrea edulis* (European flat oyster).

As used herein, the term "substantially above" in the context of the position of aquaculture structures in relation to a water surface means that the structure is at least partially, if not fully above the Water surface during the time period described, but allows for temporary complete submersion as a result of, for example, wave action. Similarly, the term "substantially below" in the context of the position of aquaculture structures in relation to a water surface means that the structure is mostly, if not completely below the water surface during the time period described, but allows for temporary exposure to the air, as a result of for example, wave action.

As used herein, the term "tide" refers to the periodic rise and fall of the sea level under the gravitational pull of the moon.

As used herein, the term "inter-tidal zone" refers to a marine zone that lies between the water surface level at high-tide and the water surface level at low-tide, and which therefore is under water at high-tide and exposed to the air at low-tide. The term "inter-tidal" describes entities, objects, features, conditions or occurrences within an inter-tidal zone.

As used herein; the term "sub-tidal zone", refers to a near-shore or tidal estuarine marine zone that lies below the inter-tidal zone, and therefore below the water surface level at low-tide, and which therefore is substantially under water at most times (but which may be exposed briefly during, for example, extreme tides and around full and new moon events). The term "sub-tidal" describes entities, objects, features, conditions or occurrences within a sub-tidal zone.

As used herein, the term "artificial inter-tidal conditions" refers to conditions produced outside the inter-tidal zone, which result from the periodic rise and fall of the sea level under the gravitational pull of the moon, imitating the naturally occurring conditions in the inter-tidal zone.

As used herein, the term "artificial sub-tidal conditions" refers to conditions produced outside the sub-tidal zone, which result from the periodic rise and fall of the sea level under the gravitational pull of the moon, imitating the naturally occurring, conditions in the sub-tidal zone.

As used herein, the term "sea bed" refers to the solid surface underlying not only open sea or ocean, but also the solid surface underlying estuaries, coves and bays.

DETAILED DESCRIPTION OF THE PREFERRED EMBODIMENTS

Aquaculture Assemblies

Figure 1:
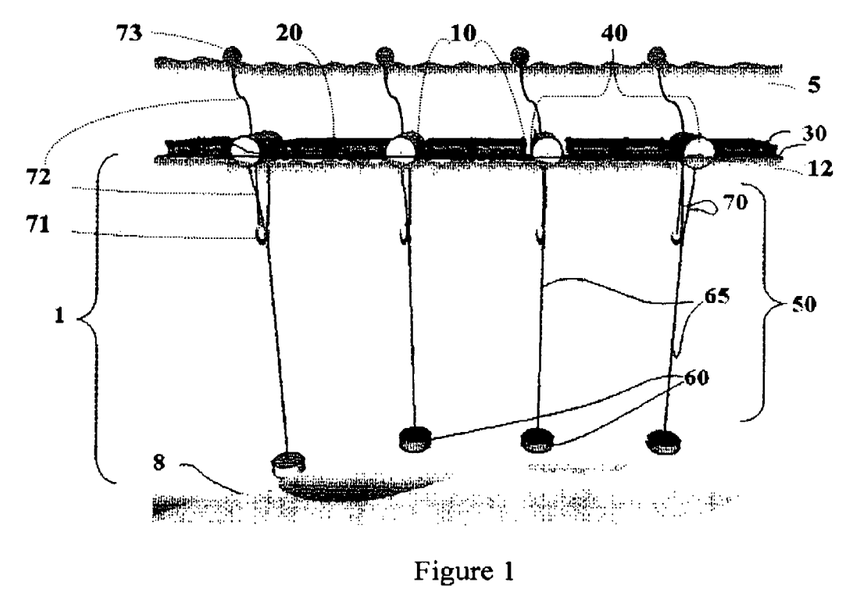
FIG. 1 illustrates an aquaculture assembly according to an embodiment of the invention comprising a series of anchored floatation means with raft-like platforms set-up along a double-backbone line.

FIG. 1 shows a first embodiment of an aquaculture assembly 1 according to the present invention. The assembly 1 comprises a plurality of spaced floatation means 10 connected to linking means 30 provided as parallel backbone lines supporting respective aquaculture structures 20 between each pair of floatation means 10 forming a plurality of raft-like platforms 40. Each structure 20 is adapted for culturing an aquacultural species. Each floatation means 10 is connected to sea bed 8 by at least one anchoring means 50.

Floatation means 10 may comprise any suitable means for providing adequate floatation to support aquaculture structures 20 substantially at the desired height above the sea bed 8. The nature and size of aquaculture structure 20 may, therefore, dictate to some extent the size and nature of floatation means 10. Suitable floatation means for use in various embodiments of the present invention include rotary moulded polyethylene plastic floats, hollow plastic or metal cylinders, foam or expanded polystyrene based floatation devices, or other floatation means as are well known, although others purpose-made for assemblies according to the present invention may also be created. Suitable commercially available aquaculture and marine floats may include those from, for example: Indac Ltd, PO Box 378 Blenheim, New Zealand; Global Contract Services, Pty Ltd, 1317 Oaks Court, Sorell, Tasmania 7172, Australia; and Plastic Fabrication Pty Ltd, 8 Negara Crescent, Goodwood, Tasmania 7010, Australia.

Aquaculture structure 20 may be supported at a height above the sea bed 8 such that it is partially or fully above water surface 12 during low tide, as illustrated in FIG. 2A and partially or fully below water surface 5 during high tide, as illustrated in FIG. 2B, thereby exposing structure 20 and its contents to artificial inter-tidal conditions. Alternatively, structure 20 may be supported at a height above the sea bed 8 such that it is just below the water surface 12 at low tide and fully below the water surface 5 at high tide, thereby exposing structure 20 and its contents to artificial sub-tidal conditions (and therefore associated currents and wave action).

Aquaculture structures for use in the present invention may comprise any suitable structure upon or within which desired aquacultural species may be grown or cultivated. Suitable structures may comprise, for example, frames, baskets, cages, screens, trays, mesh bags, or containers, or any combination thereof as are known in the art for growing or culturing desired aquacultural species. Suitable aquaculture structures may comprise oyster baskets, screens, trays or frames, especially those commercially available from, for example: Hexcyl Systems, PO Box 633 Ceduna, South Australia 5690, Australia; Seapa Pty Ltd, 26-28 Erudina Avenue, Edwardston, South Australia 5039, Australia; Tooltech Pty Ltd, 19-25 Antimony Street, Carole Park, Queensland 4300, Australia; and BST Oyster Supplies Pty Ltd, PO Box 356, Cowell, South Australia 5602, Australia. Suitable aquaculture structures may also be purpose-made for use with assemblies according to the present invention. Suitable aquaculture structures may also comprise the floatation means or part thereof or, similarly, the floatation means may comprise the aquaculture structure(s).

Aquaculture structures, where these do not comprise the floatation means, may be connected to the floatation means by any suitable means, including lashing, tying or bolting of the structure(s) to the floatation means, linking means or both with, for example, synthetic or natural ropes, cable, chains, metal bolts and the like. Interlocking mechanisms and rapid-release mechanisms are also contemplated as means for fastening aquaculture structures to the floatation means, linking means or both. Releasable interlocking or rapid-release mechanisms would allow for greater ease of servicing of the aquaculture structures or harvesting of their contents.

Figures 5A, 5B:
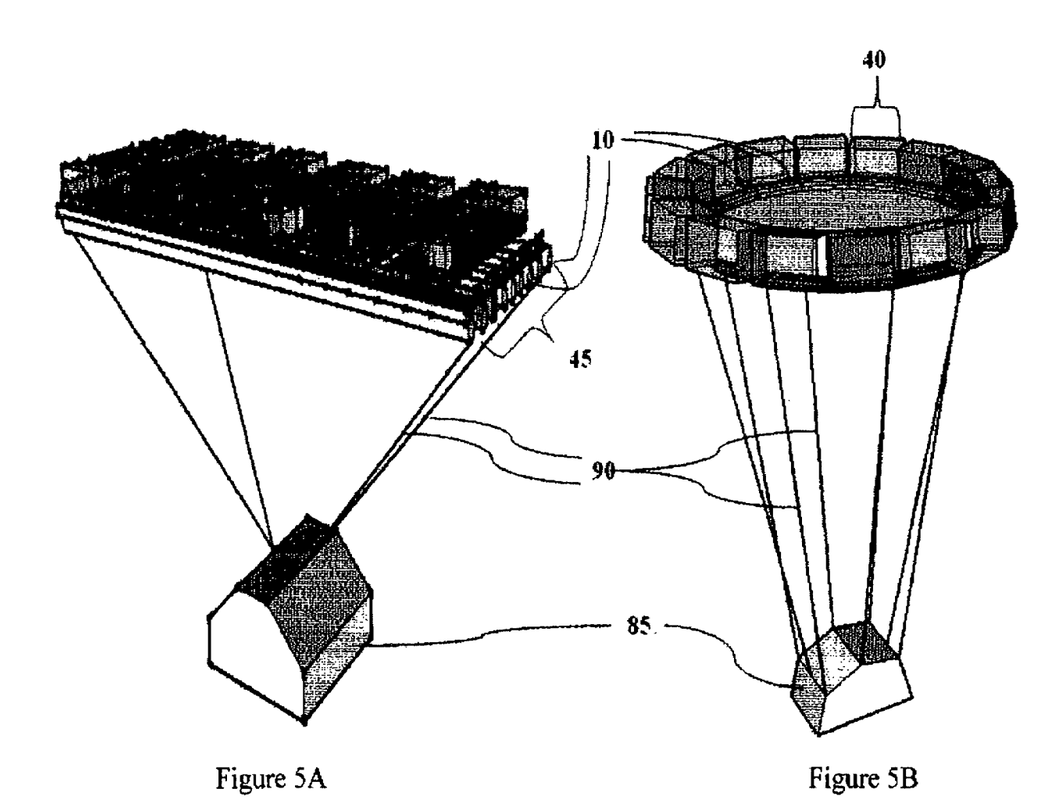
FIGS. 5A and 5B illustrate aquaculture assemblies according to another embodiment of the invention.
Figure 6:
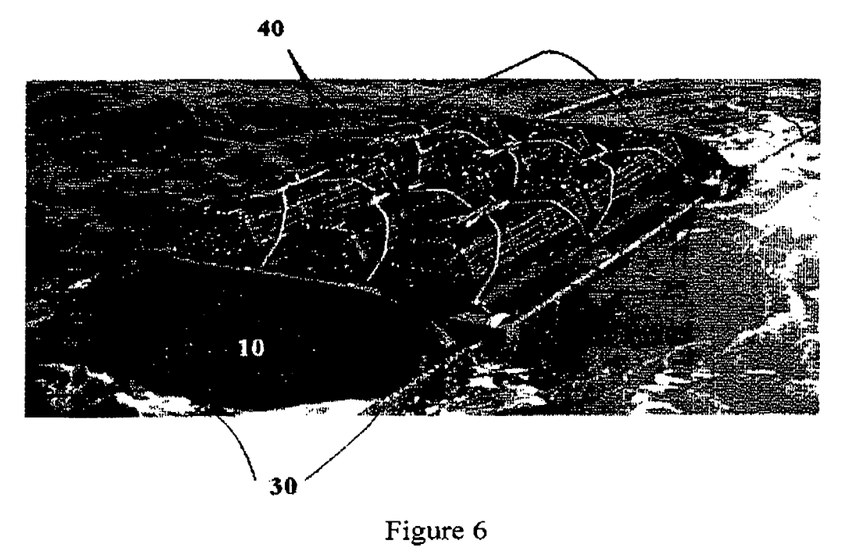
FIGS. 6 and 7 illustrate a single raft-like platform assembly according to an embodiment of the invention secured to a double-backbone line at low tide (FIG. 6) and at high tide (FIG. 7), showing oyster baskets being held above the water at low-tide and submerged at high-tide.
Figure 7:
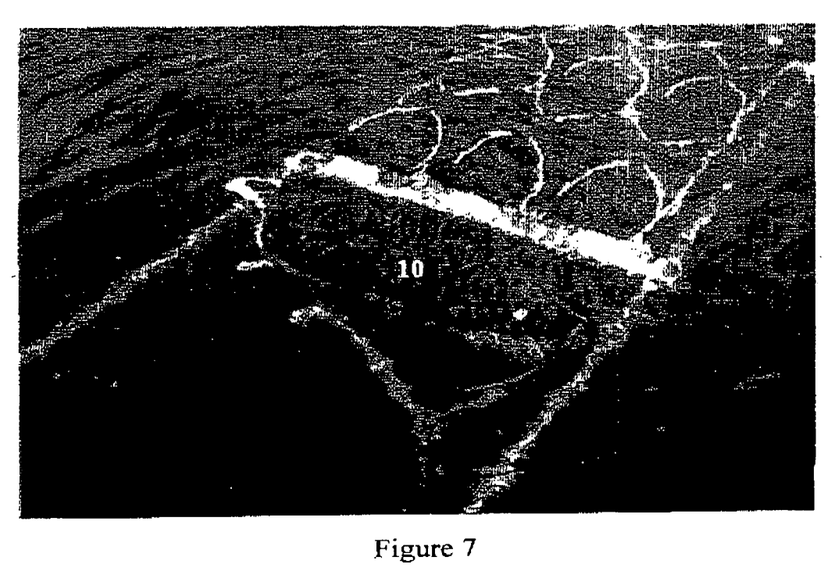
Figure 8:
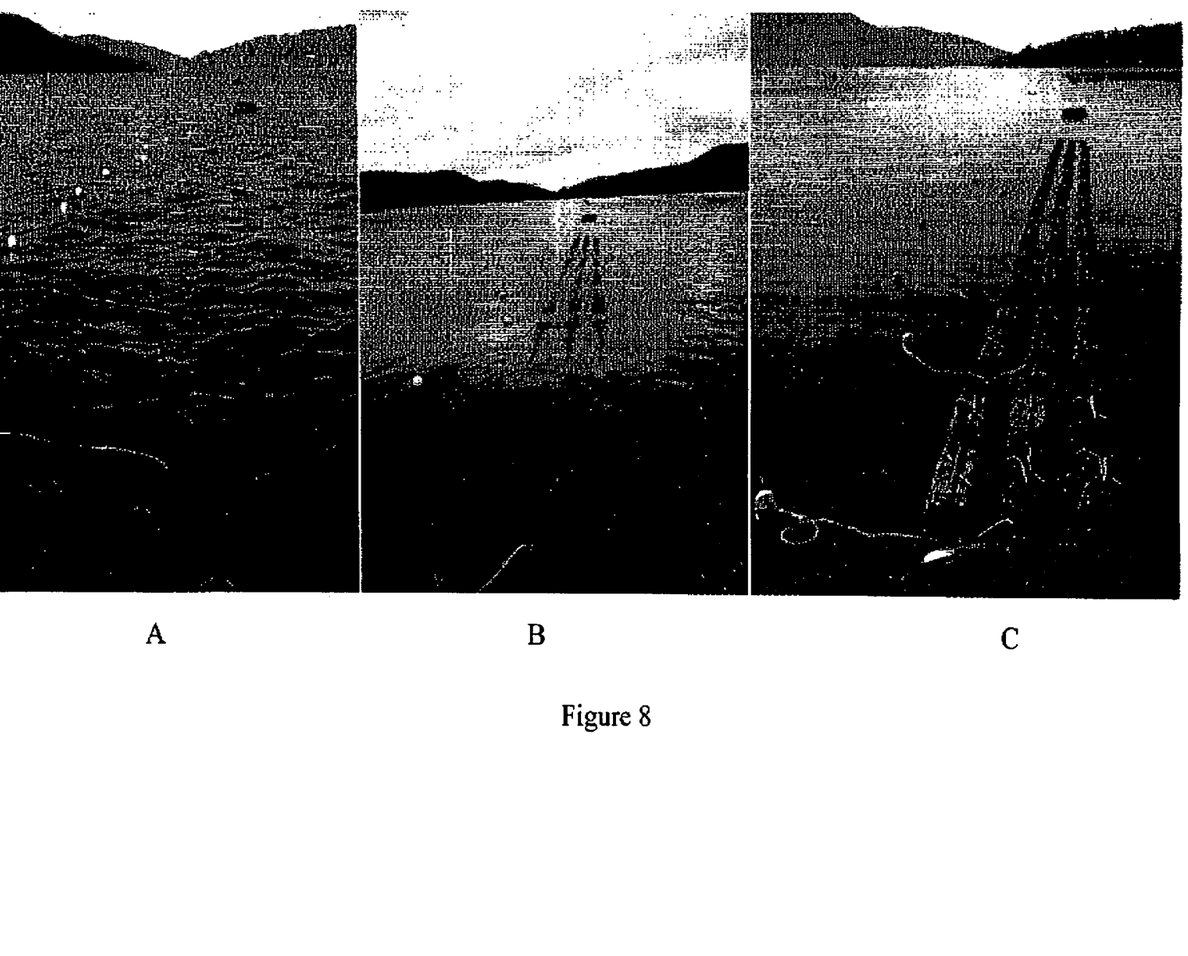
FIGS. 8A to 8C illustrate a line of raft-like platform assemblies according to an embodiment of the invention secured to a double-backbone line at high tide (FIG. 8A), where the raft-like platforms are fully submerged, in between tides (FIG. 8B) where the raft-like platforms are emerging from the water, and towards low tide (FIG. 8C) where the raft-like platforms are substantially above the water surface.
Figure 9:
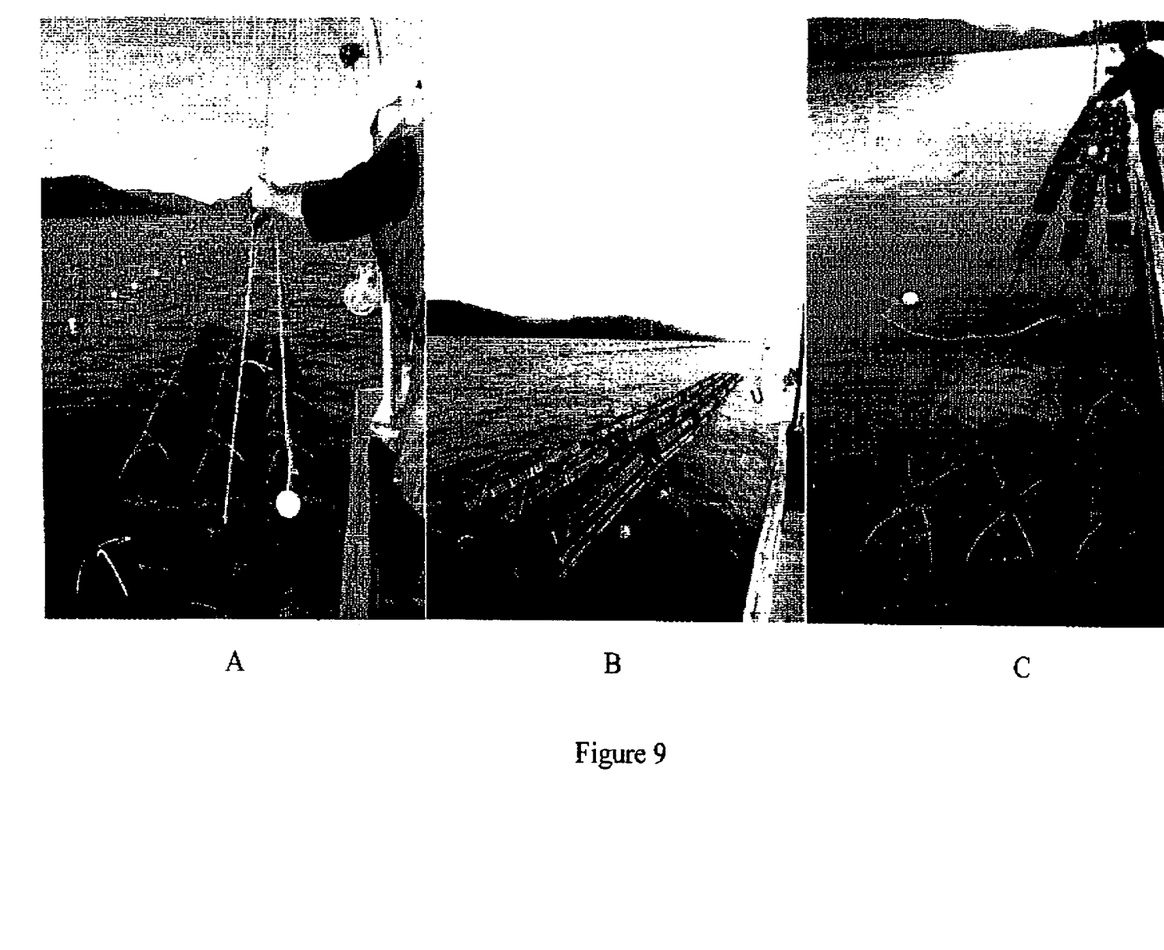
FIGS. 9A to 9C illustrate a line of raft-like platform assemblies according to an embodiment of the invention secured to a double-backbone line being worked on by an operator, releasing the raft-like platforms from their anchoring, and then re-setting them to operating depth.

As illustrated in FIG. 5, aquaculture structures 20 may comprise cross-members 25 resting across and being supported by double-backbone lines 30, wherein oyster baskets (as aquaculture structures) are fastened to cross-members 25.

In the embodiment illustrated in FIG. 1, anchoring means 50 comprises an anchor 60 connected to floatation means 10 by anchor line 65 and bridle means 70. Anchoring means 50 may be connected to floatation means 10 directly, or indirectly, via structure 20 or linking means 30.

Anchors for use in the present invention may comprise concrete blocks of sufficient weight to anchor the floatation means and structure(s) to the sea bed. Alternatively, anchors may comprise devices embedded into the sea bed at fixed points such as screw anchors, for example: the Wombat Anchor from Screwpile Engineering Pty Ltd, 3-5 James Street, Bayswater, Western Australia 6053, Australia; or Screw Marine Anchors from Mariner Supply, Inc., 945 Hildebrand Lane NE, Suite 220, Bainbridge Island, Wash. 98110, United States of America. Suitable anchors may also comprise solid and substantially immovable features of the sea bed, or connectors attached thereto, such as bolts, ringbolts and the like. Other suitable anchoring means would be apparent to persons familiar with marine anchoring systems.

While anchor lines may be connected to floatation means without bridle means, bridle means may impart more stability to raft-like platforms.

Anchor lines and, if present, bridle means may comprise any suitable material as known in the art such as, for example, rope, cable, chain or any combination thereof.

Figure 2:
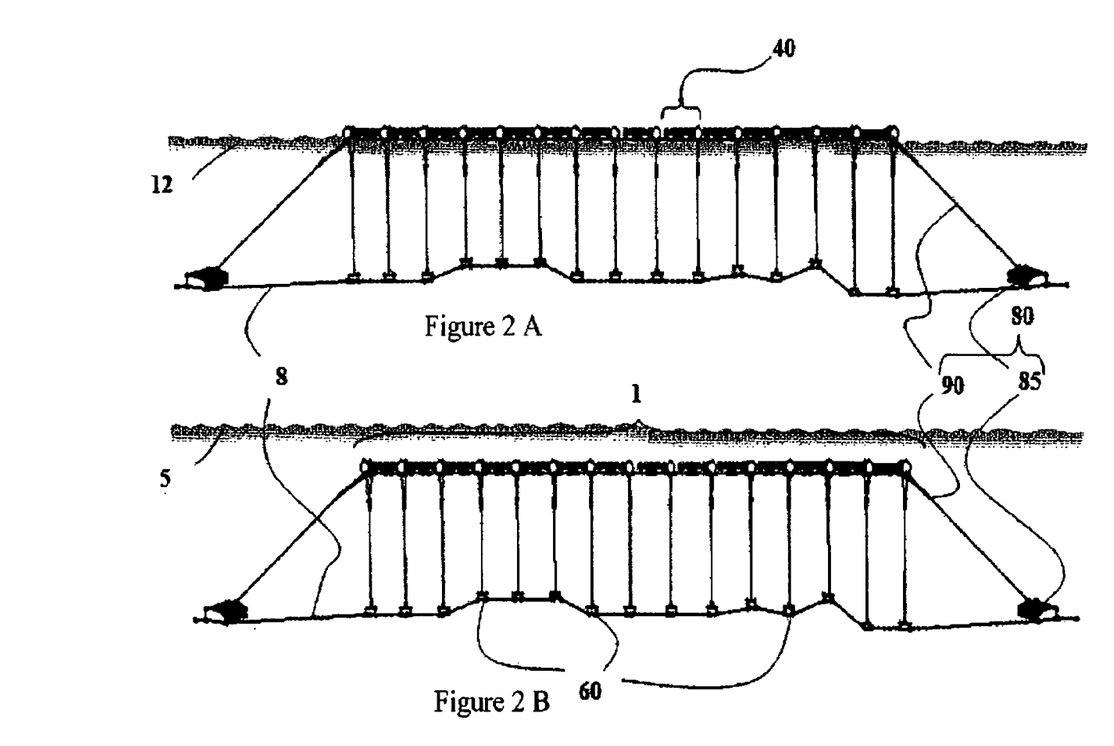
FIGS. 2A and 2B illustrate an aquaculture assembly according to an embodiment of the invention at low and high tides respectively.

According to another embodiment as illustrated in FIGS. 2A and 2B, further stabilisation of an assembly 1 may be provided by counterposed stabilising means 80 connected to each end of assembly 1. In the embodiment illustrated in FIG. 2, each stabilising means 80 comprises an anchor 85 and anchor-warp line 90 (which may be adjustable in length). Anchors 85 may comprise similar materials/objects as anchors 60, and in an embodiment may be larger than anchors 60 and/or be anchored more firmly to the sea bed 8. Suitable available anchors for anchor 85 may be, for example: the Stingray Anchor and the Danforth Anchor from Jayco Pty Ltd, 65 Discovery Drive, Bibra Lake, Western Australia 6163, Australia; or a Bruce Anchoring system from The Bruce Anchor Group, Anchor House, Cronkbourne, Douglas, Isle of Man, IM4 4QE, British Isles.

Anchor lines 65, bridle means. 70, or both anchor lines and bridle means may comprise adjustment means to change the distance between an anchor 60 and respective floatation means 10, aquaculture structure 20 and/or raft-like platform 40. The depth of the aquaculture assembly in the inter-tidal zone, or sub-tidal zone, may be set at low-tide and measured according to tidal datum. A number of depth-adjustment mechanisms are possible and known. For example, in a preferred embodiment illustrated in FIG. 3A, at system installation the depth-adjusting rope 72 may be marked at each float simultaneously across the entire length of a double-backbone 30, setting reference points 75 according to the water surface; this enables the system to be set up along a level plane. Several reference marks 75, such as coloured tags, may be added at measured distances from the initial mark; for example at 0.3 m, 0.4 m, 0.5 m and 0.6 m according to tidal datum (as many marks as required or desired at a particular site); in addition a mark may be placed lower than tidal datum enabling the system to be fully submerged at low-tide if required. Reference points 75 allow cross-reference in depth adjustment across the system as a whole, and also allow the operator to return the system to the correct position at times when the floatation has been released to the water surface to carry out work; as required at times other than low-tide. If anchoring ropes become stretched unevenly from float to float along the backbone, the reference points may be repositioned to realign the system. In various embodiments, depth-adjusting rope 72 may be adjusted at an attachment point on or near a floatation means or linking means. Anchor lines 65 provide other adjustment points at the junction with bridle means 70.

The distance of each floatation means from a respective anchor may be adjustable independently of the distance between other floatation means and respective, or shared anchors, allowing for adjustment of the position of floatation devices with respect to the water surface and each other even if the sea bed is uneven, allowing for linked raft-like platforms to form a substantially level structure (as illustrated in, for example, FIGS. 2A and 2B).

According to other embodiments of aquaculture assemblies of the invention, a plurality of floatation means, aquaculture structures or both may be connected to each other by linking means other than a double-backbone line. For example, a plurality of floatation means, aquaculture structures or both may be connected along a single backbone line. Discontinuous linking means are also contemplated, as well as jointed linking means. Linking means may comprise any suitable known means for linking water-bound vessels, such as rope lines, cables, and chains. Other linking means which may be considered include flexible or inflexible materials, such as stiff linkages (made of for example, metals, woods or plastics or combinations thereof), optionally connected to each floatation means and/or aquaculture structures by pivoting joints, thereby allowing movement of one floatation means, at least in one plane, relative to a connected floatation means and/or aquaculture structure. A combination of the means described above may be employed for linking floatation means to one another and/or to aquaculture structures. The linking means may comprise the floatation means, or part thereof, where the linking means comprises a low-density material.

According to other embodiments of aquaculture assemblies of the invention, a plurality of anchors may be connected through respective anchor lines to a single floatation means. One such embodiment of an assembly according to the invention may comprise a single floatation means. An alternative embodiment may comprise crossing anchor lines, whereby each floatation means is anchored to more than one anchor as shown in, for example, FIG. 4. In another embodiment of the invention, a plurality of anchor lines may be connected to a single floatation means or a series of rigidly connected floatation means. One such embodiment of an assembly according to the invention may comprise a single floatation means as shown in, for example, FIG. 5A or 5B.

According to other embodiments of aquaculture assemblies of the invention, a plurality of floatation means may be connected by respective anchor lines to a common anchor. In the embodiments shown in FIGS. 5A and 5B, an assembly according to the invention may comprise a plurality of raft-like platforms 40 or a super-raft-like platform 45 in a circular or rectangular structure connected to the same anchor 60 by anchor lines 65.

According to further embodiments, aquaculture assemblies of the present invention may comprise a single floatation means, a single aquaculture structure, or both. In one such embodiment, the floatation means may be large and stable enough to support a plurality of aquaculture structures and may be connected to one or several anchors. Where connected to one anchor, connection may be by one, or a plurality of anchor lines. If one anchor line is employed, connection of anchor line(s) to floatation means by bridle means may impart additional stability to raft-like platforms.

According to other embodiments, aquaculture assemblies of the present invention may comprise a single aquacultural structure. One such embodiment may comprise floatation means connected to counterposed positions of the aquacultural structure, with each floatation means connected by respective anchor lines (optionally through bridle means) to one or more anchors.

Aquaculture Methods

The present invention also relates to methods for culturing aquacultural species employing assemblies according to the present invention as described above.

Aquaculture assemblies of the present invention provide the aquaculture industry with a new approach to oyster farming in deep water: an assembly according to the invention can provide an artificial inter-tidal or sub-tidal zone in deep-water sites, providing conditions similar to those found in shallow inter-tidal or sub-tidal waters. This allows for, for example, inter-tidal aquaculture species, such as oysters and clams, to be exposed to the required amount of time out of water or for sub-tidal species to be exposed to conditions promoting shell hardening and cleaning/hygiene.

Aquaculture structures such as oyster baskets or containers held above water at low-tide are submerged at high-tide (as shown in, for example, FIGS. 2A, 2B and 6 to 12). Depth adjustment of the system allows aquaculturalists to determine the amount of time the structures and their contents are out of water, allowing different amounts of inter-tidal exposure. In an alternative embodiment, depth adjustment of the system will allow aquaculturalists to position oyster baskets (for sub-tidal species) in a zone of the water column providing conditions similar to those found in sub-tidal zones. In addition, in storm conditions the assembly can be locked at a safer depth until the weather improves and, in the event of heavy rainfall at estuary sites where a layer of fresh water forms over the surface of the sea water, the structures can be positioned below this layer.

Furthermore, the design of the assemblies of the present invention will allow ease of handling when attaching and removing the aquaculture structures while maintaining a secure fixture at all other times. For example, the floatation may be released to the water surface to allow work to be carried out on the assemblies irrespective of the current tide.

Figure 10:
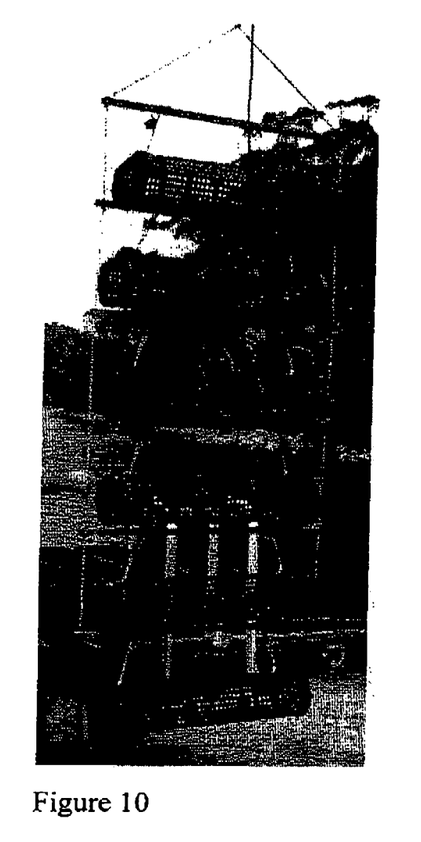
FIG. 10 shows an existing sub-tidal oyster growing assembly which may be used in combination with an aquaculture assembly according to the invention, to promote a minimal handling approach to growing oysters through a seamless interface between the inter-tidal zone and deep water.

An assembly according to the present invention allows for locking of a series of anchored floatation means and associated aquaculture structures, on a level plane, in an artificial intertidal zone, or even submerged in an artificial sub-tidal zone, and a single assembly may also allow for some aquaculture structures to be maintained in an artificial inter-tidal zone while maintaining others in a fully submerged state. This may be advantageous, as certain aquaculture species such as inter-tidal oysters, during growth, may require less time experiencing inter-tidal exposure above water level, than in deep water. This arrangement may therefore offer a new minimal handling approach to farming oysters in deep water. For example, when used in conjunction with existing sub-surface oyster growing systems such as the Whayman ladder system, an assembly of the present invention may provide a seamless interface between deep-water and inter-tidal conditions at the same site. At suitable deep-water sites, a series of ladders (an example of a ladder being shown in FIG. 13), each holding a number of oyster baskets (typically 6), may be fastened to a backbone line, evenly on either side in the case of a double-backbone line. These ladders hang vertically to the desired depth. Aquaculture structures may be transferred to the ladders and vice-versa at appropriate intervals of time, according to the species being farmed and the features of the farm. Regular rotation of aquaculture structures and their contents from deeper water to the artificial inter-tidal or sub-tidal zone provided on raft-like platforms in assemblies of the present invention may have the added advantage of reducing aquatic fouling and keeping the baskets cleaner for longer, as exposure to the air, sunlight and wave action has this effect. Indeed oysters are cleaned by the scouring action of waves in the artificial inter-tidal zone.

Aquacultural Species

Aquacultural species contemplated for cultivation using assemblies and methods of the invention may include any species amenable to cultivation, including in particular crustaceans and molluscs. Assemblies and methods of the invention, while not being so limited, find particular application in aquaculture of molluscs and, in an embodiment, bivalve molluscs.

According to a particular embodiment, the species considered for culturing using assemblies and methods of the present invention comprise bivalve molluscs such as oysters, oyster spat, mussel spat (which benefit from some time spent in an inter-tidal/sub-tidal zone), clams, cockles, abalone, and conch. According to a further particular embodiment, the species considered for culturing using systems and methods of the present invention comprise inter-tidal bivalve molluscs and, in yet a further embodiment, oysters, in particular oysters of the genus *Crassostrea* or *Saccostrea* (such as Pacific or Sydney rock oysters). Sub-tidal species such as the Australian native flat oyster (*Ostrea angasi*) and European flat oyster (*Ostrea edulis*) benefit from being locked in the sub-tidal zone just sub-surface, where they gain the benefit of the scouring action of the waves, which will help clean and harden their shells, while they experience the full range of depths in the artificial sub-tidal zone.

EXAMPLES

According to one working example of a system according to the invention, referring to FIGS. 2A, 2B and 6 to 9, a double-backbone system is used, with backbone lines 30 (24 mm Quality Equipment Danline, available from Tasmanian Marine Distributers Pty Ltd, 28 Merton Vale Circuit, Kingston Tasmania, 7050, Australia) anchored at either end via anchor-warp lines 90 (with same 24 mm Danline) to the sea bed 8, by appropriate anchors 85 (chosen to suit the environmental conditions of the aquaculture site: for example concrete or suitably heavy anchor weight, or an embedded anchoring system; in this instance, custom made 4 tonne single wedge concrete weights were used). The double-backbone may be 100 m in length, and be tensioned and held afloat with 100 litre floats 10 (available from Global Contract Services, Pty Ltd, 1317 Oaks Court, Sorell, Tasmania 7172, Australia) fastened between backbone lines 30 at 2 m intervals (with 5 mm Quality Equipment Mussel Lashing, available from Tasmanian Marine Distributers Pty Ltd, 28 Merton Vale Circuit, Kingston Tasmania, 7050, Australia). Anchoring line 65 (made from Donaghys 12 mm Mussel. Spat Collection Rope), comprising two to three meter bridle ropes 70 (made from 12 mm Quality Equipment Danline available from Tasmanian Marine Distributers Pty Ltd, 28 Merton Vale Circuit, Kingston Tasmania, 7050, Australia), used for depth-adjustment, are attached to each float 10. At the other end, each anchoring line 65 is attached to a concrete anchoring weight 60 (or other suitable anchoring weight), or an embedded anchoring system to the sea bed (FIG. 2). Oyster baskets/containers 20 (Hexcyl Systems, PO Box 633 Ceduna, South Australia 5690, Australia, available from Plastic Fabrication Pty Ltd, 8 Negara Crescent, Goodwood, Tasmania 7010, Australia) are secured to frames 25 (prototypes constructed for trials) which are in turn secured to double-backbone line 30 between floats 10, creating raft-like platforms 40.

Various design modifications can be made to systems as described above without altering their function.

For example, in the double-backbone version, the backbone may be shorter or longer in length if a particular site requires it, a different sized float may be used if they tolerate the sub-surface conditions, and the intervals between the floats and associated baskets/containers may vary accordingly as required to maintain an even and level set-up along the double-backbone. The baskets/containers may be attached individually to floatation; they may be incorporated individually, or in a series, into a stand-alone float design or form a float:baskets:containers modular design.

At suitable sites, aquaculture systems of the present invention may take the form of a large structure which houses many baskets/containers in one floated module which is bridled and anchored to the sea bed, in a configuration that maintains a level plane across the structure. This possibility includes, for example, raft-like platforms arranged in a circular group (as illustrated in, for example, FIG. 5B), with anchor lines connecting the raft-like platforms to a single large anchor point on the sea bed, although many other options, including linear, square or rectangular arrangements of raft-like platforms (see, for example, FIG. 5A), and multiple anchor points are contemplated.

The depth adjusting feature which allows the operator to choose the height of a raft-like platform above water or depth sub-surface, or which allows the operator to release a raft-like platform to the surface for work (such as inspection, maintenance or harvesting) which may be altered as required from time to time, is optional; the assemblies may equally take a set level in the inter-tidal zone or sub-surface that is not readily height/depth adjustable.

Figure 3A:
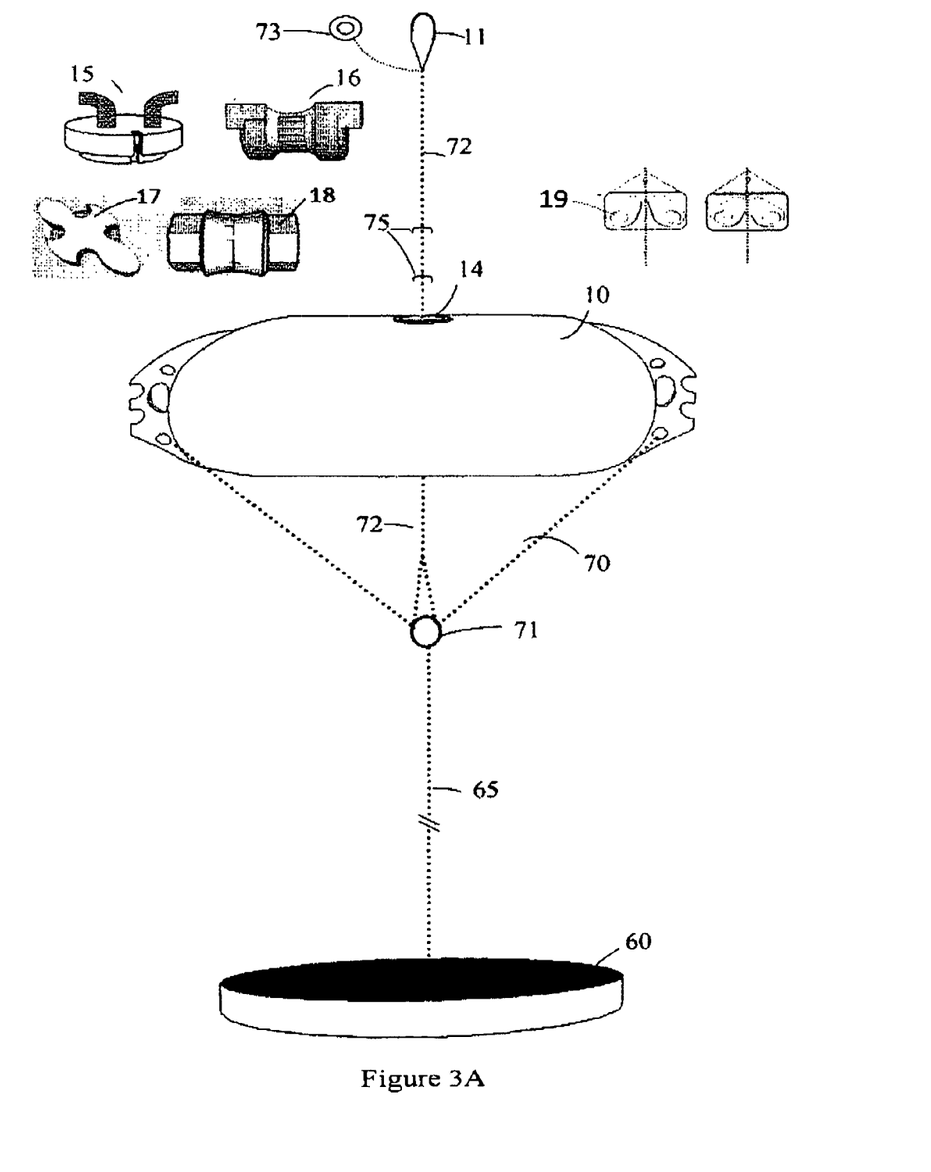
FIG. 3A illustrates an aquaculture assembly according to an embodiment of the invention comprising one of a series of anchored floatation means that have a depth-adjusting rope which allows the aquaculturalist to efficiently work the system regardless of tides. Also shown in FIG. 3A are examples of depth-adjusting rope locking and releasing mechanisms.
Figure 3B:
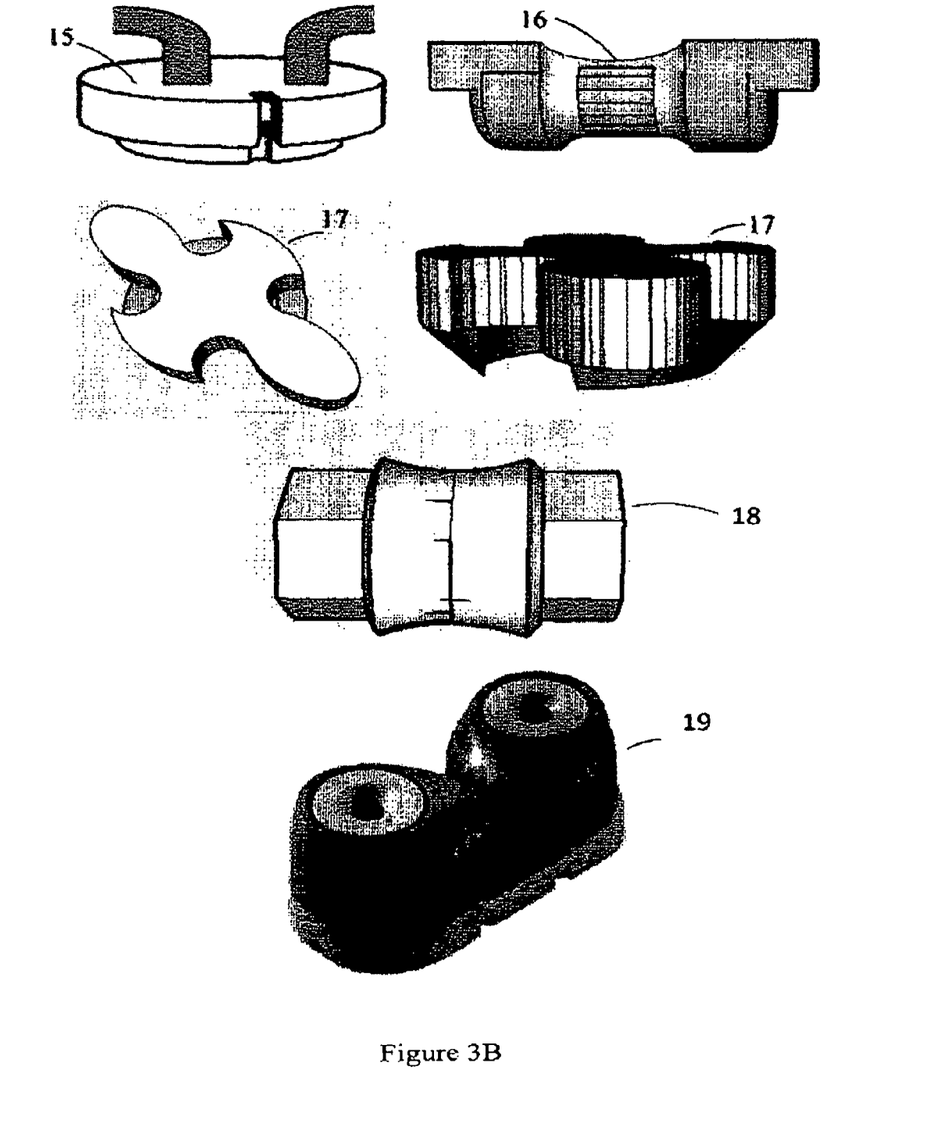
FIG. 3B illustrates in more detail locking cams and plugs for use in an aquaculture system according to an embodiment of the invention, and which allow for locking of raft-like platforms according to the invention at set heights in the water column, and for releasing them for inspection, repairs or access to the livestock being cultured.
Figure 4A:
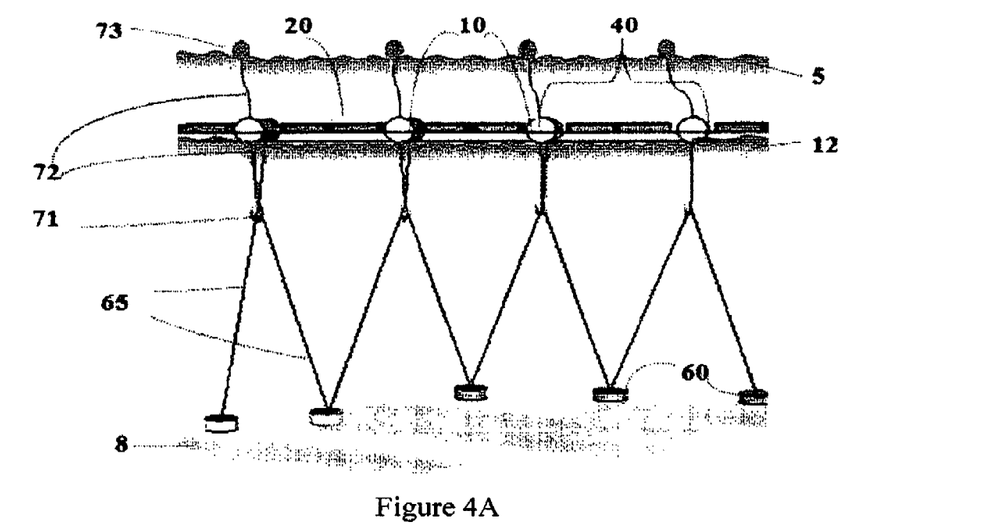
FIGS. 4A and 4B illustrate aquaculture assemblies according to another embodiment of the invention.
Figure 4B:
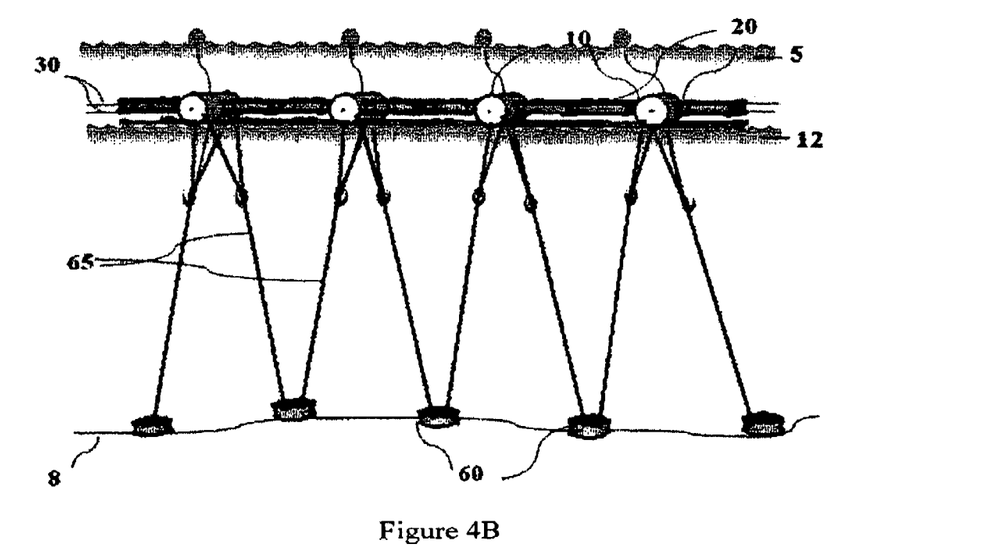

In the depth adjustment feature illustrated in FIG. 3A, a ring 71 is attached to anchor line 65 at about three metres sub-surface, and bridle means 70 may be passed through this ring; these bridle ropes are spliced to form a single depth-adjusting rope 72 at a point about 1.5 m above this ring. Ring 71 may be made of any suitable material or be of any suitable size, bearing in mind the function of the ring, being to allow bridle means 70 to run through ring 71, and hearing in mind the need for durability. A preferred ring 71 is a ring formed of steel, preferably 12 mm '316' stainless steel, the ring having an outer diameter of 90 mm. In the depth adjustment feature illustrated in FIG. 3A, floats 10 have a central pipe 14 through which depth-adjusting rope 72 may be drawn, to raise and lower the system, float by float. At the upper side of the float, this rope 72 is approximately 2 m in length and terminates with an eye-splice 11. A small polystyrene float 73 is attached near the eye-splice to mark the position of this rope when the system is submerged. The depth of the float 10 is locked by a plug device 15, or by a purpose built plug-cleat 16 (see FIG. 3B), that fits into pipe 14, and prevents further travel of the rope 72 in the downward direction. The plug or plug/cleat is positioned on this rope at a predetermined reference point 75 and fastened by belaying the rope with nautical half hitch knots.

As illustrated in FIG. 3A, float device 10 may be located by a float 73. A lifting means, such as a davit hook, is placed into the eye-splice 11, to which a lifting force is applied; the plug (which may be one of options 15, 16, 17 or 18 illustrated in FIGS. 3A and 3B) is extracted from the central pipe 14 and lifted above the water surface, pulling bridle means 70 upwards through ring 71 and resulting in pulling of float 10 further below the surface. To remove the plug, locking cams 19 (see FIGS. 3A and 3B) are placed on the rope 72 below the level of the plug. With cams in place the weight/tension can be taken off this rope by lowering the lifting hook. After the plug is removed the tension is reapplied to the rope by raising the lifting hook and releasing the locking cams, which are then removed; this frees the rope to be lowered through the central pipe as the float rises to the water surface. To replace the float sub-surface, the eye-splice is again raised with suitable means; the plug is set in place, in line with a marked reference point 75 on rope 72. The order followed is in reverse to the plug removal procedure.

FIGS. 9A to 9C show an operator releasing and re-setting raft-like platforms according to the invention by the procedure described above.

For the purpose of conducting trials of the assemblies, a series of raft-like platforms, each holding 6 oyster baskets, with associated anchored floatation, will be evenly spaced and secured along the double-backbone line. These raft-like platforms may be adaptable to a range of commercially available oyster baskets/containers. The fastening mechanisms will be easily operated, yet maintain reliability of the system to prevent accidental disconnection of the baskets/containers.

Some of the anticipated advantages of the aquaculture assemblies of the present invention include:
  oyster farms do not have to compete to gain authority to operate in the highly sought after shoreline region;
  oysters may develop similar marketable qualities at deep-water sites as those farmed at shoreline inter-tidal sites;
  oysters may have improved growth rates, quality or both as a result of a minimal-handling approach, as they are transferred seamlessly between the deep-water and inter-tidal zone at one location;
  oyster hygiene may be improved with greater access to the cleaning wave action throughout the growth cycle;

at deep-water zones oysters will have higher shell and meat growth rates and with inter-tidal exposure to the wave action and time above water surface they will produce the cupped-shape, hardened shells. The oysters tend to rumble within the secured baskets which helps to harden and shape the shells;

rumbling and grading procedures can be kept to a minimum, reducing handling stress and resultant loss;

shoreline pollution affecting oysters can be avoided;

labour productivity gains including:

oysters needing less handling as they will experience the full range of optimal conditions at one location. They may also require less frequent basket or container changes as these will tend to have less aquatic fouling; when exposed to the air at low-tide, fouling will dry out and this will tend to wash off with the wave action and tidal movement;

the system is self-cleaning, as oyster structures and baskets in the adjustable system can be unlocked and positioned above the water surface for the necessary time to kill off aquatic fouling which may have settled on these structures;

work streamlined to business hours: work may be carried out at a convenient time of day, rather than being dictated by the tidal conditions;

aquaculturalists work from a vessel rather than laboriously wading through the water and mud;

the oyster retrieval process can be mechanized utilizing a purpose-modified vessel;

time-consuming translocation between deep water and shoreline water is not required because these features may be achieved at one location;

managing the stock work at one location simplifies the job of keeping track of the oysters throughout their growth, from spat through to market.

The assemblies described in the example above relates to oysters. However, it is expected that systems according to the present invention may equally be used for any aquaculture species that benefit from stable inter-tidal or sub-tidal conditions.

It will be appreciated that, although specific embodiments of the invention have been described herein for the purpose of illustration, various modifications may be made without deviating from the spirit and scope of the invention as defined in the following claims.

The invention claimed is:

1. An aquaculture assembly comprising:
   at least one structure adapted for culturing an aquacultural species;
   at least one floatation means; and
   at least one anchoring means connecting said at least one floatation means and said at least one structure to, and at a set distance from the sea bed;
   wherein said at least one structure is connected to or comprises said at least one floatation means or said at least one floatation means comprises said at least one structure; and
   wherein said at least one floatation means is adapted to support said at least one structure substantially above the water surface at low-tide, and at least substantially below the water surface at high-tide, thereby maintaining said aquaculture species under artificial inter-tidal conditions, due to tides.

2. The assembly of claim 1, wherein said at least one anchoring means is adjustable such that the distance between said at least one structure and the sea bed is adjustable.

3. The assembly of claim 2, wherein said at least one anchoring means is adjustable such that said at least one floatation means may selectively support said at least one structure either:
   a) substantially above the water surface at low-tide, and at least substantially below the water surface at high-tide, thereby maintaining said aquacultural species under artificial inter-tidal conditions, due to tides, or
   b) substantially just below the water surface at low-tide, and fully below the water surface at high-tide, thereby maintaining said aquacultural species under artificial sub-tidal conditions, due to tides.

4. The assembly of claim 1 which comprises a plurality of structures adapted for culturing an aquacultural species.

5. The assembly of claim 1 which also supports one or more structures for culturing aquacultural species fully below the water surface at all times.

6. The assembly of claim 1 which comprises a plurality of floatation means.

7. The assembly of claim 6 wherein skid plurality of floatation means are spaced apart, having at least one structure supported between, or above, said plurality of floatation means.

8. The assembly of claim 1 which comprises a plurality of anchoring means.

9. The assembly of claim 1 which comprises a plurality of spaced floatation means connected to each other by linking means, wherein said plurality of floatation means is connected to said at least one anchoring means and supports said at least one structure.

10. The assembly of claim 9, wherein said linking means comprises at least one linking line and said plurality of spaced floatation means are connected to said linking line at intervals along its length and wherein each end of the at least one linking line is connected to counterposed stabilizing means.

11. The assembly of claim 10, which comprises two parallel linking lines, wherein said plurality of spaced floatation means are positioned between said linking lines.

12. The assembly of claim 10 wherein each one of the said plurality of spaced floatation means, is coupled to respective anchoring means.

13. The assembly of claim 12 wherein the distance between said each one of the said plurality of spaced floatation means and the sea bed is adjustable independently of the distance between the other coupled floatation and anchoring means.

14. The assembly of claim 1, wherein said aquacultural species comprises oysters or clams.

15. The assembly of claim 1, wherein said aquacultural species is the Pacific oyster (*Crassostrea gigas*), Sydney rock oyster (*Saccostrea glomerate*), American cupped oyster (*Crassostrea virginica*), Portuguese oyster (*Crassostrea angulata*), Australian native flat oyster (*Ostrea angasi*) or European flat oyster (*Ostrea edulis*).

16. A method for culturing an aquacultural species comprising cultivating said aquacultural species using an assembly according to claim 1.

17. The method of claim 16 wherein said aquacultural species comprises oysters or clams.

18. The method of claim 16, wherein said aquacultural species is the Pacific oyster (*Crassostrea gigas*), Sydney rock oyster (*Saccostrea glomerata*), American cupped oyster (*Crassostrea virginica*), Portuguese oyster (*Crassostrea angulata*), Australian native flat oyster (*Ostrea angasi*) or European flat oyster (*Ostrea edulis*).

19. A method for culturing an aquacultural species comprising cultivating said aquacultural species using an assembly according to claim 12.

\* \* \* \* \*

UNITED STATES PATENT AND TRADEMARK OFFICE
CERTIFICATE OF CORRECTION

PATENT NO. : 10,932,452 B2
APPLICATION NO. : 13/639885
DATED : March 2, 2021
INVENTOR(S) : Steven J. Leslie and Yvonne E. Young Page 1 of 1

It is certified that error appears in the above-identified patent and that said Letters Patent is hereby corrected as shown below:

In the Claims

Column 12, Line 41 "Claim 10" should read Claim 9.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*